Patented July 7, 1936

2,046,720

UNITED STATES PATENT OFFICE 2,046,720

N-HYDROXY-AMINOALKYL SUBSTITUTED ALKYLENE DIAMINES

Robert Roger Bottoms, Louisville, Ky., assignor to The Girdler Corporation, Louisville, Ky., a corporation of Delaware No Drawing. Application June 9, 1933, Serial No. 675,110

10 Claims. (Cl. 260—127)

This invention relates to a new class of organic nitrogen bases which might be termed mixed amine-amino-alcohols, and to the method of preparing and using the same.

In my previous Patent No. 1,783,901 I have disclosed a process for the separation of acidic gases from gaseous mixtures, in which a certain class of amines are used as the absorbent or as the essential part thereof. I have now discovered that certain mixed amine-amino-alcohols can be prepared having properties which render them greatly superior to the simpler amines heretofore employed. These mixed amine-amino-alcohols have a much lower vapor pressure than other amines of equal molecular weight, and consequently there is less loss in the gas separation process through evaporation than is the case with those amines previously used. Furthermore, these mixed amine-amino-alcohols have a greater absorptive capacity than other amines of similar molecular weight. This makes it possible to use smaller equipment, and consequently to use less of these compounds in the separation of gases.

Another advantage obtained in using this new class of compounds is that less power is required for circulation of the absorptive agent, and less energy is required for driving off the absorbed gases and regenerating the base.

The general structural formula of the mixed amine-amino-alcohols is:

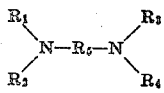

in which at least one of the four symbols $R_1$, $R_2$, $R_3$ or $R_4$ broadly represents an amino-alcohol group that is an aliphatic carbon group having attached thereto one or more hydroxyl groups and an amino group. The remaining three of the four symbols represent either hydrogen or an aliphatic carbon group which may have attached thereto an amino group and/or a hydroxyl group.

$R_5$ is used to symbolize an aliphatic carbon group containing two or more carbon atoms, and which may have attached thereto one or more hydroxyl or amino groups. When one or more hydroxyl or amino groups are attached to the aliphatic carbon group $R_5$, this carbon group must contain at least two carbon atoms more than the number of hydroxyl or amino groups attached thereto, since two hydroxyl or amino groups cannot be attached to the same carbon atom, nor can a hydroxyl group and an amino group be attached to the same carbon atom.

I believe this class of compounds is broadly new and has never before been prepared, so far as I am able to learn from a study of the literature.

As specific examples of compounds possessing the above general structure, the following compounds and the method of preparation thereof will serve to cover the class of compounds forming the subject of this invention:

I.

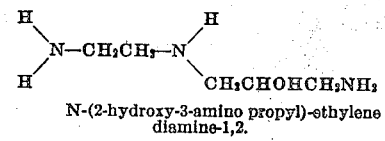

N-(2-hydroxy-3-amino propyl)-ethylene diamine-1,2.

II.

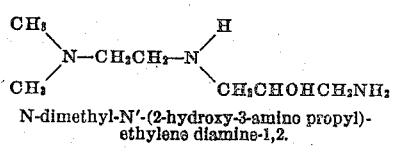

N-dimethyl-N'-(2-hydroxy-3-amino propyl)-ethylene diamine-1,2.

III.

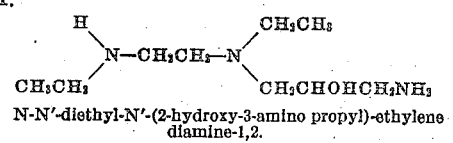

N-N'-diethyl-N'-(2-hydroxy-3-amino propyl)-ethylene diamine-1,2.

IV.

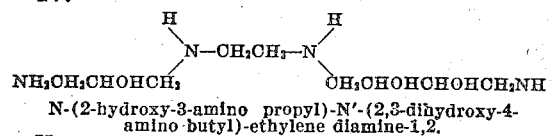

N-(2-hydroxy-3-amino propyl)-N'-(2,3-dihydroxy-4-amino butyl)-ethylene diamine-1,2.

V.

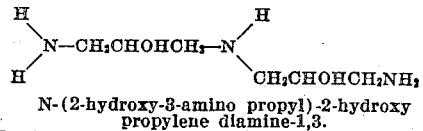

N-(2-hydroxy-3-amino propyl)-2-hydroxy propylene diamine-1,3.

VI.

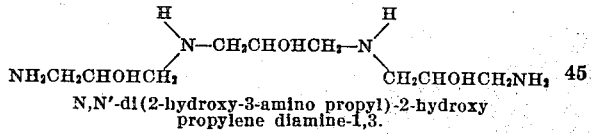

N,N'-di(2-hydroxy-3-amino propyl)-2-hydroxy propylene diamine-1,3.

These compounds are all thick, viscous liquids, crystallizable at low temperature, possessing a faint ammoniacal odor, miscible with water and alcohol in all proportions, insoluble in ether, benzene and paraffin hydrocarbons, difficultly volatile, and boil only at temperatures above 200° C., at pressures of 5 mm. or less.

The general method which I have discovered, by which the above class of compounds can be satisfactorily prepared, consists of the following: One mol of an aliphatic diamine, which may have one or more hydroxyl groups attached thereto, is cooled to 0° C., to −10° C., and while at this temperature there is slowly added thereto with constant stirring, and, depending upon the number of amino-alcohol groups which it is desired to introduce into the molecule, one, two, three or four mols of a chlor-alkylene oxide. After about two hours, when the reaction has gone to completion, the resulting reaction product is mixed with constant stirring with two liters of strong aqueous ammonia, cooled to below 30° C., and containing the theoretical quantity of fixed alkali necessary to combine with the chlorine present. After a few minutes the reaction is completed. The excess ammonia and the water are distilled off, the amine which remains, is then dissolved in half a liter of alcohol, and the alkali chloride crystals are filtered off, the alcohol is distilled off, and the impure amino-alcohol may be further distilled under a high vacuum to obtain the product of the desired high purity.

Specific examples of the reactions will serve to clarify the above general description of my method of preparation of these mixed amine-amino-alcohols.

The reactions involved in the preparation of compound No. I above are:

Ethylene-diamine + chlor-propylene oxide gives

1st step.—H₂NCH₂CH₂NH₂+CH₂CHCH₂Cl—→
\\O/

N-(2-hydroxy-3-chloro propyl) ethylene diamine
H₂NCH₂CH₂NHCH₂CHOHCH₂Cl.

2nd step.—The latter + NH₃ + NaOH gives
H₂NCH₂CH₂NHCH₂CHOHCH₂NH₂ +
NaCl + H₂O.

The reactions in the preparation of compound No. II above are:

N-di-methyl-ethylene-diamine + chlor-propylene oxide gives

1st step.—(CH₃)₂NCH₂CH₂NH₂+CH₂CHCH₂Cl—→
\\O/

N - dimethyl - N′-(2 - hydroxy-3-chloro propyl)-ethylene diamine
(CH₃)₂NCH₂CH₂NHCH₂CHOHCH₂Cl.

2nd step.—The latter + NH₃ + NaOH gives
(CH₃)₂NCH₂CH₂NHCH₂CHOHCH₂NH₂ +
NaCl + H₂O.

The reactions in the preparation of compound No. IV above are:

Ethylene-diamine + chlor - propylene oxide + 3-hydroxy-4-chlor-butylene oxide-1.2 gives 1st step.—H₂NCH₂CH₂NH₂+CH₂CHCH₂Cl+
\\O/
CH₂CHCHOHCH₂Cl—→
\\O/

N-(2-hydroxy-3 chloro propyl)-N′-(2,3-dihydroxy-4-chlorobutyl)-ethylene diamine
ClCH₂CHOHCH₂NHCH₂CH₂
    NHCH₂CHOHCHOHCH₂Cl 2nd step.—The latter + 2NH₃ + 2NaOH =
NH₂CH₂CHOHCH₂NHCH₂CH₂NHCH₂
    CHOHCHOHCH₂NH₂ + 2NaCl + 2H₂O The reactions in the preparation of compound No. V above are:

1-3-diamino - propanol - 2 + chlor - propylene-oxide, gives

1st step.—H₂NCH₂CHOHCH₂NH₂+CH₂CHCH₂Cl—→
\\O/

N-(2 - hydroxy-3-chloro propyl)-2-hydroxy-propylene + diamine-1,3
H₂NCH₂CHOHCH₂NHCH₂CHOHCH₂Cl.

2nd step.—The latter + NH₃ + NaOH gives:
H₂NCH₂CHOHCH₂NHCH₂CHOHCH₂NH₂.

The reactions in the preparation of compound No. VI above are:

1-3-diamino-propanol-2 + 2 chlor-propylene oxide gives

1st step.—H₂NCH₂CHOHCH₂NH₂+2CH₂CHCH₂Cl—→
\\O/

N,N′-di(2-hydroxy-3-chloro propyl)-2-hydroxy-propylene diamine-1,3
ClCH₂CHOHCH₂NHCH₂CHOHCH₂
    NHCH₂CHOHCH₂Cl 2nd step.—The latter + 2NH₃ + 2NaOH gives
H₂NCH₂CHOHCH₂NHCH₂CHOHCH₂
    NHCH₂CHOHCH₂NH₂.

The methods of preparing the intermediates, namely the alkylene diamines and the chlor-alkylene oxides, are well known, and will not be repeated here.

In the process of producing these mixed amine-amino-alcohols, it is advisable to carry out the first step of the process at a temperature of 0° C. or below, inasmuch as a great deal of heat is liberated in the reaction, and at temperatures above 0° C. the reaction is extremely rapid and polymerization of the amine-chlor derivative will take place.

In the second step, in order to prevent the formation of amine polymers and other side reaction products, it is advisable that the ammonia be in large excess, for example from 5 to 10 times the theoretical amount, and that fixed alkali be present in the solution in not less than the theoretical amount to combine with the chlorine or other halide of the reactants. An excess of alkali is of no particular advantage and does no particular harm if not too greatly in excess, for example, if it is not greater than 25% to 30% excess. Where the term "chlor" is used it is to be understood that other halides may be used in place of chlorine.

Having thus described my invention, what I claim as new and desire to secure by Letters Patent is:

1. A process of producing N-(hydroxy-aminoalkyl) substitute alkylene alpha-omega diamines, the amino and the hydroxyl groups being bonded to different carbon atoms, having the general structure

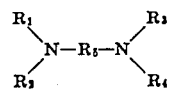

in which at least one of the symbols R₁, R₂, R₃ and R₄ represents an amino substituted lower alkylol, in which the amino- and hydroxyl-groups are bonded to different carbon atoms not bonded to the nitrogen bonded to R₅, and the remaining symbols represent substituents selected from the group consisting of hydrogen and lower alkyl groups, and R₅ represents a residue selected from the group consisting of ethylene and 2-hydroxy propylene, which process includes substituting for an N-hydrogen atom in the lower alkylene alpha-omega diamine, a lower amino substituted alkylol, in which the amino- and hydroxyl-groups are bonded to different carbon atoms not bonded to the nitrogen bonded to R₅.

2. A process of producing N-hydroxy-aminoalkyl) substituted alkylene alpha-omega diamines, the amino and the hydroxyl groups being bonded to different carbon atoms, having the general structure

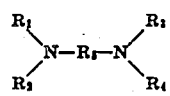

in which at least one of the symbols R₁, R₂, R₃ and $R_4$ represents an amino substituted lower alkylol, in which the amino- and hydroxyl-groups are bonded to different carbon atoms not bonded to the nitrogen bonded to $R_5$, and the remaining symbols represent substituents selected from the group consisting of hydrogen and lower alkyl groups, and $R_5$ represents a residue selected from the group consisting of ethylene and 2-hydroxy propylene, which includes the steps of acting upon a lower alkylene alpha-omega diamine with a chlor-lower alkylene oxide, in which the oxygen is bonded to two adjacent carbon atoms and the chlorine is bonded to still another carbon atom adjacent to said two adjacent carbon atoms, to produce a N-(chlor-hydroxy-alkyl) derivative of the diamine, in which the chlorine atom and hydroxyl group are bonded to different carbon atoms not bonded to the nitrogen bonded to $R_5$, and subsequently substituting an amino group for the chlorine atom in the N-(chlor-hydroxy-alkyl) derivative.

3. A process of producing N-(hydroxy-aminoalkyl) substituted alkylene alpha-omega diamines, the amino and the hydroxyl groups being bonded to different carbon atoms, having the general structure

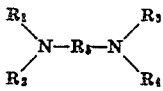

in which at least one of the symbols $R_1$, $R_2$, $R_3$ and $R_4$ represents an amino substituted lower alkylol, in which the amino- and hydroxyl-groups are bonded to different carbon atoms not bonded to the nitrogen bonded to $R_5$, and the remaining symbols represent substitutents selected from the group consisting of hydrogen, and lower alkyl groups and $R_5$ represents a residue selected from the group consisting of ethylene and 2-hydroxy propylene, which process includes the steps of acting upon a lower alkylene alpha-omega diamine with a chlor- lower alkylene oxide, in which the oxygen is bonded to two adjacent carbon atoms and the chlorine is bonded to still another carbon atom adjacent to said two adjacent carbon atoms at 0° C. to —10° C., to produce an N-(chlor-hydroxy-alkyl) derivative of the diamine, in which the chlorine atom and hydroxyl group are bonded to different carbon atoms not bonded to the nitrogen bonded to $R_5$, and subsequently substituting an amino group for the chlorine atom in the N-(chlor-hydroxy-alkyl) derivative by the action of an excess of ammonia in the presence of a fixed alkali.

4. The process of producing N-(2-hydroxy-3-amino propyl)-ethylene diamine-1,2, which includes effecting reaction between ethylene diamine and chlor-propylene oxide at a temperature of 0° C. to —10° C., and effecting reaction between the resulting product and ammonia and free fixed alkali, the ammonia being in excess of the theoretical requirement.

5. The process of producing N-(2-hydroxy-3-amino propyl)-2- hydroxy propylene diamine-1,3, which includes effecting reaction between 1,3-diamino propanol-2 and chlor-propylene oxide at a temperature of —10° C., and effecting reaction between the resulting product and ammonia and free fixed alkali, the ammonia being in excess of the theoretical requirement.

6. The process of producing N, N'-di-(2-hydroxy-3-amino propyl)-2-hydroxy propylene diamine-1,3, which includes effecting reaction between 1,3-diamino propanol-2 and chlor-propylene oxide at a temperature of —10° C., and effecting reaction between the resulting product and ammonia and free fixed alkali, the ammonia being in excess of the theoretical requirements.

7. A N-(hydroxy-amino-alkyl) substitute alkylene alpha-omega diamine, the amino and the hydroxyl groups being bonded to different carbon atoms, having the general structure

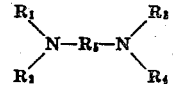

in which at least one of the symbols $R_1$, $R_2$, $R_3$ and $R_4$ represents an amino substituted lower alkylol, in which the amino- and hydroxyl-groups are bonded to different carbon atoms not bonded to the nitrogen bonded to $R_5$, and the remaining symbols represent substituents selected from the group consisting of hydrogen, and lower alkyl groups, and $R_5$ represents a residue selected from the group consisting of ethylene and 2-hydroxy-propylene.

8. As a new chemical compound,

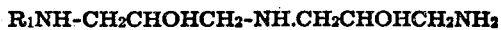

where $R_1$ represents 3-amino-2-hydroxylpropyl.

9. As a new chemical compound, 3-amino-2-hydroxypropyl nitrogen substituted ethylene diamine-1-2.

10. As a new chemical compound 3-amino-2-hydroxypropyl nitrogen substituted 2-hydroxypropylene diamine-1,3.

ROBERT ROGER BOTTOMS.